(12) United States Patent
Clark

(10) Patent No.: US 7,328,605 B2
(45) Date of Patent: Feb. 12, 2008

(54) ICE-PROCESSING DEVICE

(75) Inventor: Terry A. Clark, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 144 days.

(21) Appl. No.: 11/343,654

(22) Filed: Jan. 31, 2006

(65) Prior Publication Data

US 2007/0186631 A1   Aug. 16, 2007

(51) Int. Cl.
*G01M 15/00* (2006.01)
(52) U.S. Cl. .................. 73/117.1; 73/119 R; 73/865.6
(58) Field of Classification Search .................. 73/112, 73/116, 117.1, 117.2, 117.3, 117.4, 118.1, 73/118.2, 119 R, 865.6
See application file for complete search history.

(56) References Cited

U.S. PATENT DOCUMENTS

| 5,182,944 | A  | * | 2/1993 | Brunnenkant | ............... 73/117.1 |
| 6,868,721 | B2 | * | 3/2005 | Szilder | .................... 73/170.26 |
| 2007/0102573 | A1 | * | 5/2007 | Goto | ........................ 244/76 R |

OTHER PUBLICATIONS

Davis Engineering, *Hailstorm Simulator* (2 pages), at http://www.davis-eng.on.ca/hailgun.htm (Dec. 9, 2005).

* cited by examiner

*Primary Examiner*—Eric S. McCall
(74) *Attorney, Agent, or Firm*—Kinney & Lange, P.A.

(57) ABSTRACT

An ice-processing device is configured to test a consequence of ice on an aircraft engine component by simulating an effect on the ice upstream of the component.

20 Claims, 1 Drawing Sheet

ICE-PROCESSING DEVICE

BACKGROUND

The present invention relates to a device for testing a gas turbine engine. More particularly, the present invention relates to an ice-processing device that may be used to certify the engine, or a component of the engine.

Before an aircraft gas turbine engine is placed into service, the engine must be certified by the Federal Aviation Administration (AA). Some certifications, such as an air-bleed certification, requires the engine to continue normal operation while ingesting a certain amount of ice particles of a particular size and velocity. The FAA typically preapproves the amount of ice that a gas turbine engine should move (or "bleed") away from itself, which is specified by the engine manufacturer. In conventional methods of certifying a gas turbine engine, the engine is subjected to a stream of ice particles that simulate a hailstorm. The testing is typically performed in a large work area, where a machine discharges large quantities of standard-size ice particles toward a full-size, working engine.

If the engine fails the certification test, it is difficult for an operator to visually inspect the engine components in order to determine why the engine failed the test because the entire engine is subjected to the stream of ice particles. For example, if the engine failed because of ice build-up in a certain component, the operator may not be able to disassemble the gas turbine engine and visually inspect the individual components before the ice melts.

BRIEF SUMMARY

The present invention is an ice-processing device that simulates an effect on ice upstream of a component, such as a gas turbine engine component. The ice-processing device may be used to certify a gas turbine engine, or a component thereof

DETAILED DESCRIPTION

Figure 1:
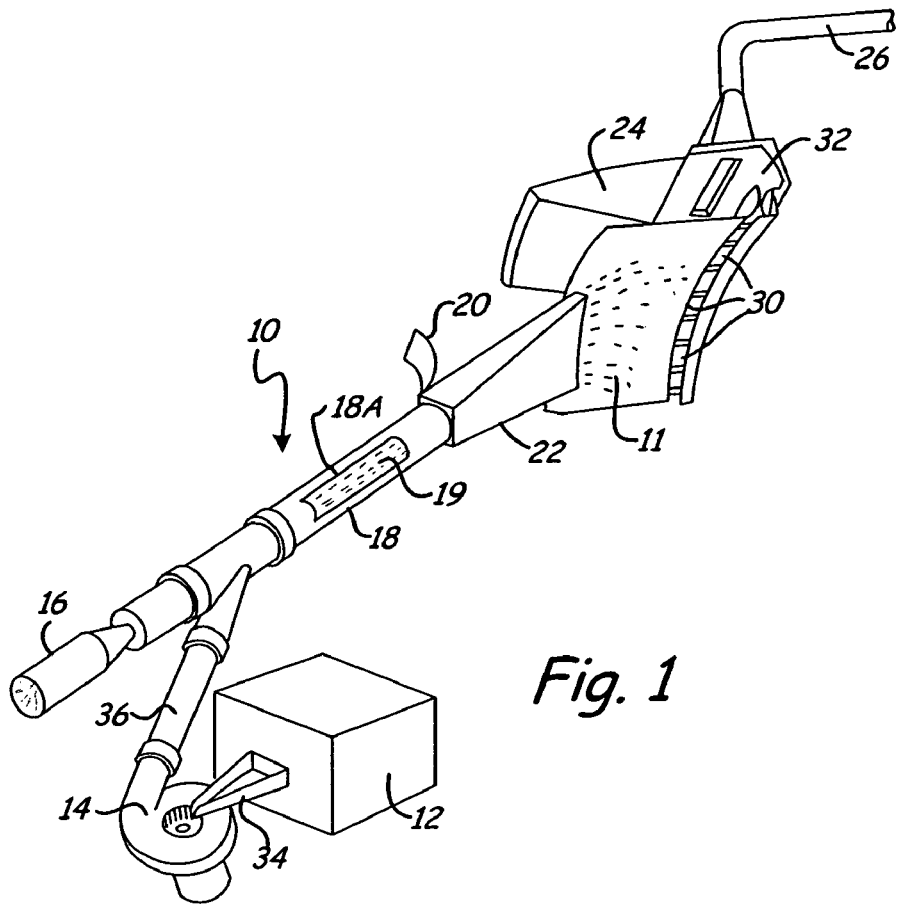
FIG. 1 is a schematic perspective view of an ice-processing device in accordance with the present invention, where a nozzle of the ice-processing device is directed at a gas turbine engine bleed port and bleed casting.

The present invention is an ice-processing device that produces an ice stream having an adjustable ice particle size and discharge velocity. An ice-processing device in accordance with the present invention may be used to test the effects (or consequence) of ice on an aircraft engine component by simulating effects on the ice upstream of the component. When a gas turbine engine ingests ice particles, different gas turbine engine components are subjected to different ice particle sizes and velocities, depending upon the location of the component within the engine. For example, ice particles are likely to decrease in size through each stage in a multistage axial flow compressor, because as the ice particles hit the compressor vanes, they are likely to break into smaller pieces. Similarly, the ice particles are likely to change in velocity through each stage in the multistage compressor because air velocity changes through each stage. An ice-processing device in accordance with the present invention allows the ice particle size and discharge velocity to be adjusted in order to simulate the specific size and velocity of the ice particles that a particular gas turbine engine component is likely to be exposed to during operation of the engine. The particle size and velocity may be determined through any suitable means, such as a computerized simulation program.

During operation in an aircraft, a gas turbine engine may be exposed to a hailstorm A ice-processing device of the present invention can be used to simulate the hailstorm for testing and certification purposes. In conventional methods of ice testing a gas turbine engine, the ice-processing device lacks controls for adjusting the ice particle size and discharge velocity of an ice stream. However, the particle size and velocity controls are typically unnecessary in conventional methods because a full-size, working gas turbine engine is used in the testing process. The full-working gas turbine engine naturally forms the ice particle size and velocity that each component would encounter during operation, thus, eliminating the need to simulate of the size and velocity of the ice particles at the different stages of the gas turbine engine. The particle sizes and velocities resulting when standard size ice particles are ingested by a working gas turbine engine are hereinafter referred to as the "natural" particle sizes and velocities, and the resulting ice stream is hereinafter referred to as the "natural ice stream."

While conventional methods are useful, certain inconveniences exist. As discussed in the Background section, if the engine fails the certification test, it is difficult for an operator to visually inspect the engine components in order to determine why the engine failed the test. Determining the reason for test failure typically involves determining which gas turbine engine component failed the test.

The present invention allows gas turbine engine components to be tested individually, rather than testing the gas turbine engine as a whole. Rather than subjecting a full-size, working engine to a stream of ice particles, the ice-processing device of the present invention allows an individual gas turbine engine component to be extracted from the engine and tested. Specifically, an operator may simulate an ice stream that is produced by a working gas turbine engine by adjusting the particle size and velocity of the ice stream produced by an ice-processing device of the present invention. The ice-processing device of the present invention simulates natural particle size and velocities the extracted component would be exposed to during operation of the gas turbine engine.

FIG. 1 is a schematic perspective view of ice-processing device 10 in accordance with the present invention. Ice-processing device 10 device includes ice crusher 12, centrifugal accelerator 14, air supply 16, ice acceleration section 18, Coanda plate 20, ice spreading nozzle 22, viewing window 24, and vacuum source 26. As described below, ice crusher 12, centrifugal accelerator 14, air supply 16, and nozzle 22 all contribute to the particle size and velocity of the ice particles in ice stream 11, which is discharged from nozzle 22. In FIG. 1, ice-processing device 10 is configured to test bleed port 30 and bleed casting 32 (and associated engine hardware) of a gas turbine engine.

One type of FAA certification is the engine bleed certification. A gas turbine engine typically includes a multistage axial flow compressor to supply high-pressure gas for combustion and subsequent expansion in a coaxial multistage turbine. Many engine configurations split the compressor and turbine into high and low pressure/speed sections. A typical engine core flow path extends from a low compressor combustor to a high compressor combustor, subsequently to a high-pressure turbine, and finally to a low-pressure turbine. In some gas turbine engine configurations, compressor air is bled from the core flow path through bleed ports in an outer wall surrounding the flow path. The bleed air may be required for several purposes. For example, a certain percentage of bleed air is generally used to help ensure stable engine operation at reduced power. At the same time, bleed port 30 provides a path to remove excessive ice or water that would otherwise cool air in the engine below the temperature at which a burner section of engine can maintain combustion. It is important, therefore, for bleed port 30 to remain substantially unclogged by ice.

While ice-processing device 10 is described with reference to an engine bleed certification, it should be understood that bleed certification is merely one application of ice-processing device 10. Ice-processing device 10 may be used to test other gas turbine engine components, as well as other components that are tested using ice particles.

Returning now to ice-processing device 10, ice crusher 12 is any suitable ice crusher, which preferably includes a variable drive for adjusting the speed with which the ice is crushed. In one embodiment, ice crusher 12 is a Clawson model CM-30B, which is made commercially available by Clawson Machine of Franklin, N.J. The Clawson model CM-30B is modified to include a two-horse power (HP) motor with a variable speed drive. It is preferred that ice crusher 12 have variable speed drive for allowing accurate control of the rate of ice flow through the system, which helps to control the size of the ice particles in ice stream 11.

After an operator adjusts the parameters of ice crusher 12 to select a desirable output ice particle size, standard sized ice cubes (e.g., 1¼ inch square) are introduced into ice crusher 12. Ice crusher 12 then crushes the ice cubes to the desired particle size. In an alternative embodiment, the operator can adjust the parameters of ice crusher 12 after the standard sized ice cubes are introduced into ice crusher 12. Any suitable icemaker known in the art may be used to obtain the standard sized ice cubes. In the embodiment shown in FIG. 1, ice cubes that are about 1¼ inch square are provided by commercial ice cube maker model GT351 AC by Kold Draft of Erie, Pa. In the embodiment of ice-processing device 10 that is used to certain bleed port 30 and bleed casting 32, ice crusher 12 crushes the ice particles to about ¼ inch square particles.

The crushed ice particles are gravity fed from ice crusher 12 and into centrifugal accelerator 14 through channel 34. FIG. 1 is a schematic perspective view of ice-processing device and is not shown to scale. In one embodiment, ice crusher 12 is positioned about two feet above (i.e., in the vertical direction) centrifugal accelerator 14. The height difference between ice crusher and centrifugal accelerator 14 facilitates the gravity feed of the ice particles. In the embodiment shown in FIG. 1, centrifugal accelerator 14 is an eight-inch diameter snow blower rotor driven at 1725 revolutions per minute by a 2 HP alternating current (AC) motor. The rotor is enclosed in a 12-inch diameter scroll shaped casing. Of course, in alternate embodiments, other suitable rotors and casings can be substituted.

Centrifugal accelerator 14 accelerates the ice particles. The size of the ice particles also decrease as they move through centrifugal accelerator 14 because the ice particles incidentally hit the inner surface of centrifugal accelerator 14 and break into smaller particles while moving through centrifugal accelerator 14. In the embodiment of FIG. 1, where bleed port 30 and bleed casting 32 are tested, centrifugal accelerator 14 produces a steady flow of crushed ice particles at an average speed of about 60 feet/second.

The crushed ice particles move from centrifugal accelerator 14 to ice acceleration section 18 through flow path 36. Flow path 36 is formed of a PVC pipe that is, for example, about four inches in diameter. Ice acceleration section 18 is also formed of a PVC pipe that is, for example, about four inches in diameter and about 10 feet long. In alternate embodiments, other materials and dimensions are used for flow path 36 and ice acceleration section 18. The exact size of ice acceleration section 18 and flow path 36 can be varied, depending upon the size and velocity of ice particles that are desired, as well as available materials.

The ice particles are mixed with air from air supply 16 in ice acceleration section 18, thereby forming ice stream 19 (which is shown in FIG. 1 through cutout 18A in ice acceleration section 18). Air supply 16 provides a flow of compressed air to further accelerate the ice particles, which helps to simulate the natural gas turbine engine conditions and further decrease the size of the ice particles (as the particles contact the inner surface of ice spreading nozzle 22). The airflow rate of the compressed air depends upon the component that is being tested because, as previously mentioned, the location of a component in the engine affects the operating conditions to which the component is exposed. In the embodiment shown in FIG. 1, air supply 16 provides about one to about three pounds/second of air flow at pressures ranging from about 2 to about 10 pounds per square inch (psi) in order to further accelerate the ice particles to target speeds ranging from about 150 to about 400 feet/second. The temperature of the acceleration air from air supply 16 is controlled by mixing a specific proportion of normal room temperature air with chilled air.

Excess acceleration air (and any excess water) is removed from ice stream 19 by Coanda plate 20 as the acceleration air and ice particles move from ice acceleration section 18 to nozzle 22. The accelerating air typically moves significantly faster than the air in the turbine engine at the desired test condition, and in order to simulate the natural operating conditions, the accelerating air is removed from ice stream 19. As known in the art, Coanda plate is based on the Coanda effect, under which a stream of fluid (e.g., the acceleration air) will tend to follow a convex surface, rather than follow a straight line in its original direction.

Ice spreading nozzle 22 is set in a particular position adjacent to bleed port 30 and bleed casting 32 (or whatever component is being tested). As ice stream 19 moves through nozzle 22, ice particles are likely to hit the inner surfaces of nozzle 22, thus further reducing the size of the ice particles, as mentioned above. In the embodiment shown in FIG. 1, nozzle 22 is positioned about six inches from bleed port 30, and particles that are discharged from nozzle 22 after running through the ice-processing device 10 are about 0.005 to about 0.010 inches in diameter and have a velocity of about 200 to about 300 feet/second. As ice stream 19 is discharged through nozzle 22, ice stream 19 forms ice stream 11, which has an ice particle distribution that simulates the natural conditions in the gas turbine engine. As with the ice particle size and velocity, the natural distribution of the ice particles in ice stream 11 may depend upon the component that is being tested. The shape and size of nozzle 22 determines the distribution of ice stream 11, and as a result, the shape and size of ice spreading nozzle 22 may depend on the component being tested.

Figure 2:
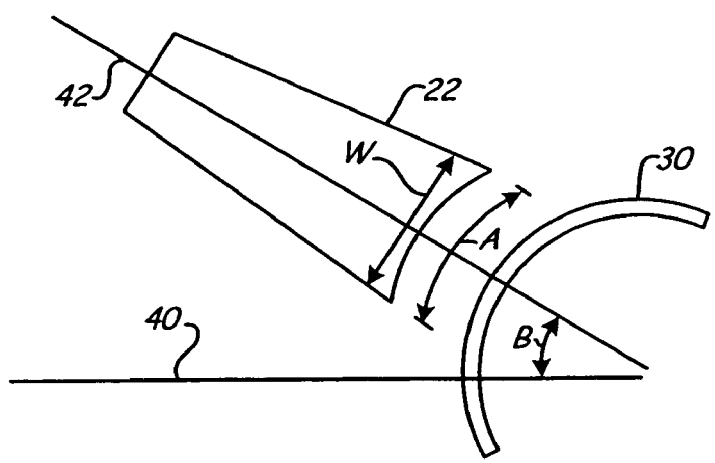
FIG. 2 is a side view of the nozzle of the ice-processing device of FIG. 1 and the bleed port of FIG. 1.

FIG. 2 illustrates a side view of nozzle 22 and bleed port 30. Nozzle 22 distributes ice stream 11 (shown in FIG. 1) over a desired arc section A, provides the proper radial distribution of ice, and assures that that relative angle B of ice stream 11 with respect to bleed port 30 is correct (i.e., the relative angle is the angle with which an ice stream would contact bleed port during operation of the engine). One variable that is used to determine the shape and size of nozzle 22 is an angle at which ice stream 11 contacts the component that is being tested. FIG. 2 illustrates a relative angle B between centerline 40 of bleed port 30 and centerline 42 of nozzle 22. The relative angle B can be used to approximate the relative angle of ice stream 11 with respect to bleed port 30.

Another variable that is used to determine the shape and size of nozzle 22 is arc section A of ice stream 11, which is discharged from nozzle 22. Typically, the greater arc section A, the greater the width W of nozzle 22. The arc typically varies from about 20° to 45°, but ultimately depends on the circumferential symmetry of the parts under test. A computer simulation program can be used to determine the natural arc section and relative angle between ice stream 11 and bleed port 30 (or other component being tested).

Returning now to FIG. 1, window 24 is positioned between nozzle 22 and vacuum source 26 and provides visual access to observe any ice obstruction that may occur in bleed port 30 and/or bleed casting 32. In this way, ice-processing device 10 in accordance with the present invention provides instant access to the cause of failure if bleed port 30 and bleed casting 32 fail the certification process. Window 24 can also be adapted to work with other components that are being tested. Window 24 is preferably formed of a material that is impact-resistant, such as Plexiglas or Lexan (a polycarbonate material), which are known in the art.

Vacuum source 26 simulates the same driving pressures that exist in the actual gas turbine engine at the designated critical operating condition and draws the air and ice from nozzle 22 through bleed port 30 and bleed casting 32. Prior to testing the engine, the FAA typically approves the critical operating condition specified by the engine manufacturer for the engine bleed certification process. Vacuum source 26 is set and regulated prior to the start of ice flow through ice-processing device 10.

Ice bypassing the bleed port is captured and weighed to determine the percentage split of ice that exits the bleed versus the ice that bypasses the bleed and enters downstream section of the engine. In order to become certified, the amount ice that is bypasses the bleed must be less than an amount specified by the engine manufacturer and approved by the FAA. Of course, other types of certification and testing procedures may have different testing parameters and standards.

The values (e.g., horse power values, ice particle speeds, etc.) discussed above with respect to ice-processing device 10 are merely examples, and are not intended to limit the present invention in any way. One skilled in the art will recognize that such dimensions and values may be modified without departing from the scope of the present invention. The present invention generally relates to an ice-processing device that produces ice particles of a particular, controllable size and velocity in order to test a gas turbine engine component (or another type of component).

The terminology used herein is for the purpose of description, not limitation. Specific structural and functional details disclosed herein are not to be interpreted as limiting, but merely as bases for teaching one skilled in the art to variously employ the present invention. Although the present invention has been described with reference to preferred embodiments, workers skilled in the art will recognize that changes may be made in form and detail without departing from the spirit and scope of the invention.

The invention claimed is:

1. An ice-processing device comprising:
    an ice crusher configured to receive a plurality of ice particles;
    a centrifugal accelerator downstream of the ice crusher and adapted to accelerate the plurality of ice particles;
    an ice acceleration section downstream of the centrifugal accelerator and configured to receive the plurality of ice particles from the centrifugal accelerator;
    an air supply adapted to feed compressed air into the ice acceleration section, wherein the compressed air accelerates the plurality of ice particles in the ice acceleration section, thereby forming an ice stream;
    a Coanda plate configured to remove the compressed air from the ice stream; and
    a nozzle downstream of the Coanda plate.

2. The ice-processing device of claim 1, wherein the ice crusher includes a variable speed drive.

3. The ice-processing device of claim 1, wherein the centrifugal accelerator is configured to reduce the size of each of the plurality of ice particles.

4. The ice-processing device of claim 1, wherein the centrifugal accelerator is configured to accelerate the ice particles to a speed of about 60 feet/second.

5. The ice-processing device of claim 1, wherein the centrifugal accelerator includes a rotor driven at about 1725 revolutions per minute.

6. The ice-processing device of claim 1, wherein the ice acceleration section is formed of polyvinyl chloride.

7. The ice-processing device of claim 1, and further comprising:
    a vacuum source positioned downstream of the nozzle.

8. The ice-processing device of claim 1, and further comprising:
    a window box downstream of the nozzle and configured to provide visual access to a component that is being tested by the ice-processing device.

9. The ice-processing device of claim 1, wherein the air supply provides the compressed air at a rate of about three pounds/second.

10. The ice-processing device of claim 1, wherein the compressed air has a pressure in a range of about 2 to about 10 pounds per square inch.

11. The ice-processing device of claim 1, wherein the ice stream has a velocity of about 150 to about 400 feet/second.

12. The ice-processing device of claim 1, wherein the ice-processing device is a part of a jet engine air bleed certification system.

13. A method of testing a consequence of ice on an aircraft engine component, the method characterized by:
    controlling operation of an ice-processing device to produce an ice stream comprising ice having a particle size and velocity that simulates a natural particle size and velocity of ice that of the component could be exposed to during in-flight operation of the aircraft engine; and
    directing the ice stream at the component to test the component separate from the engine.

14. The method of claim 13, wherein an ice-processing device comprises:
    an ice crusher configured to receive a plurality of ice particles;
    a centrifugal accelerator downstream of the ice crusher and adapted to accelerate the plurality of ice particles;
    an ice acceleration section downstream of the centrifugal accelerator and configured to receive the plurality of ice particles from the centrifugal accelerator;

an air supply adapted to feed compressed air into the ice acceleration section, wherein compressed air accelerates the plurality of ice particles in the ice acceleration section, thereby forming the ice stream;

a Coanda plate configured to remove the compressed air from the ice stream; and a nozzle downstream of the Coanda plate.

15. A method of testing a component, the method comprising:

positioning a nozzle of an ice-processing device with respect to the component, the ice-processing device comprising:

an ice crusher configured to receive a plurality of ice particles;

a centrifugal accelerator downstream of the ice crusher and adapted to accelerate the plurality of ice particles;

an ice acceleration section downstream of the centrifugal accelerator and configured to receive the plurality of ice particles from the centrifugal accelerator;

an air supply adapted to feed compressed air into the ice acceleration section, wherein compressed air accelerates the plurality of ice particles in the ice acceleration section, thereby forming an ice stream; and a Coanda plate configured to remove the compressed air from the ice stream, wherein the nozzle is downstream of the Coanda plate; and introducing the plurality of ice particles into the variable speed ice crusher.

16. The method of claim 15, wherein the nozzle is positioned about six inches from the component.

17. The method of claim 15, wherein the ice crusher of the ice-processing device includes a variable speed drive.

18. The method of claim 15, wherein the centrifugal accelerator of the ice-processing device is configured to accelerate the ice particles to a speed of about 60 feet/second.

19. The method of claim 15, wherein the ice stream has a velocity of about 150 to about 400 feet/second.

20. The method of claim 15, wherein the component is a gas turbine engine bleed port.

* * * * *